United States Patent
Chung et al.

(10) Patent No.: US 10,956,645 B2
(45) Date of Patent: Mar. 23, 2021

(54) ADAPTIVE MULTI-TIER POWER DISTRIBUTION GRIDS FOR INTEGRATED CIRCUITS

(71) Applicant: QUALCOMM Incorporated, San Diego, CA (US)

(72) Inventors: Joon Hyung Chung, San Marcos, CA (US); Mikhail Popovich, Danville, CA (US); Gudoor Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/366,918

(22) Filed: Mar. 27, 2019

(65) Prior Publication Data

US 2019/0220571 A1  Jul. 18, 2019

Related U.S. Application Data

(63) Continuation of application No. 15/432,431, filed on Feb. 14, 2017, now Pat. No. 10,318,694.

(Continued)

(51) Int. Cl.
| | |
|---|---|
| *H01L 29/40* | (2006.01) |
| *H01L 23/52* | (2006.01) |
| *H01L 23/48* | (2006.01) |
| *G06F 30/394* | (2020.01) |
| *G06F 30/39* | (2020.01) |
| *G06F 30/327* | (2020.01) |

(Continued)

(52) U.S. Cl.
CPC .......... *G06F 30/394* (2020.01); *G06F 30/327* (2020.01); *G06F 30/39* (2020.01); *G06F 30/392* (2020.01); *G06F 30/398* (2020.01); *H01L 23/5226* (2013.01); *H01L 23/5286* (2013.01); *G06F 2115/08* (2020.01); *G06F 2119/06* (2020.01)

(58) Field of Classification Search
CPC ...... G06F 30/394; G06F 30/39; G06F 30/327; G06F 30/392; G06F 30/398; G06F 2115/08; G06F 2119/06; H01L 23/5226; H01L 23/5286
See application file for complete search history.

(56) References Cited

U.S. PATENT DOCUMENTS

| | | |
|---|---|---|
| 7,234,124 B2 | 6/2007 | Chen et al. |
| 7,480,887 B1 | 1/2009 | Hsu |

(Continued)

FOREIGN PATENT DOCUMENTS

| | | |
|---|---|---|
| JP | 2001250917 A | 9/2001 |
| JP | 2004031389 A | 1/2004 |

(Continued)

OTHER PUBLICATIONS

International Search Report and Written Opinion—PCT/US2017/058550—ISA/EPO—dated Mar. 15, 2018.

(Continued)

*Primary Examiner* — Ismail A Muse
(74) *Attorney, Agent, or Firm* — Qualcomm Incorporated

(57) ABSTRACT

The place and route stage for a hard macro is modified to assign a more robust power-grid tier to a critical path for a hard macro and to assign a less robust power-grid tier to a remainder of the hard macro.

12 Claims, 7 Drawing Sheets

Related U.S. Application Data

(60) Provisional application No. 62/424,289, filed on Nov. 18, 2016.

(51) Int. Cl.
  *G06F 30/392* (2020.01)
  *G06F 30/398* (2020.01)
  *H01L 23/522* (2006.01)
  *H01L 23/528* (2006.01)
  *G06F 115/08* (2020.01)
  *G06F 119/06* (2020.01)

(56) References Cited

U.S. PATENT DOCUMENTS

| | | | |
|---|---|---|---|
| 8,042,072 B2 | 10/2011 | Vogel et al. | |
| 8,336,018 B2 | 12/2012 | Turner et al. | |
| 9,098,666 B2 | 8/2015 | Samadi et al. | |
| 2004/0089953 A1 | 5/2004 | McCormick et al. | |
| 2005/0133894 A1* | 6/2005 | Bohr | H01L 24/02 257/678 |
| 2005/0200383 A1* | 9/2005 | Ogata | H01L 27/0203 326/41 |
| 2005/0233570 A1* | 10/2005 | Bohr | H01L 24/13 438/613 |
| 2006/0234496 A1 | 10/2006 | Zhao et al. | |
| 2007/0241779 A1* | 10/2007 | Ogata | H03K 19/0013 326/38 |
| 2007/0241790 A1* | 10/2007 | Ogata | H03K 19/0016 326/41 |
| 2011/0140272 A1 | 6/2011 | Zhao et al. | |
| 2011/0260318 A1 | 10/2011 | Eisenstadt | |
| 2013/0091478 A1 | 4/2013 | Li et al. | |
| 2013/0221538 A1* | 8/2013 | Funane | G11C 11/417 257/774 |
| 2014/0252650 A1 | 9/2014 | Utsumi | |
| 2015/0379182 A1 | 12/2015 | Huynh et al. | |
| 2017/0093405 A1 | 3/2017 | Wang | |
| 2018/0144086 A1 | 5/2018 | Chung et al. | |
| 2018/0323148 A1 | 11/2018 | Nakayama et al. | |

FOREIGN PATENT DOCUMENTS

| | | |
|---|---|---|
| JP | 2005209776 A | 8/2005 |
| JP | 2005268695 A | 9/2005 |
| JP | 2009111117 A | 5/2009 |
| JP | 2010123895 A | 6/2010 |
| JP | 2011091178 A | 5/2011 |
| JP | 2014175493 A | 9/2014 |
| JP | 2016103973 A | 6/2016 |
| KR | 20120026997 A | 3/2012 |
| WO | 2014085689 A1 | 6/2014 |

OTHER PUBLICATIONS

Partial International Search Report—PCT/US2017/058550—ISA/EPO—dated Jan. 19, 2018.

Singh J., et al., "A fast Algorithm for power grid design," Proceedings of the International Symposium on Physical Design—Proceedings of ISPD ' May 2005 International Symposium on Physical Design 2005 Association for Computing Machinery, US, 2005, pp. 70-77, XP002561674.

Singh J., et al., "Partition-based Algorithm for Power Grid Design Using Locality," IEEE Transactions on Computer-Aided Design of Integrated Circuits and Systems IEEE, USA, vol. 25, Apr. 2006, pp. 664-677, XP002561675.

* cited by examiner

US 10,956,645 B2

ADAPTIVE MULTI-TIER POWER DISTRIBUTION GRIDS FOR INTEGRATED CIRCUITS

CROSS-REFERENCE TO RELATED APPLICATIONS

The present application is a continuation of U.S. patent application Ser. No. 15/432,431, filed Feb. 14, 2017, which claims priority to and the benefit of the U.S. Provisional Patent Application No. 62/424,289, filed Nov. 18, 2016, each of which is hereby incorporated by reference in its entirety.

TECHNICAL FIELD

This application relates to power distribution for integrated circuits, and more particularly to an integrated circuit adaptive multi-tier power distribution grid.

BACKGROUND

Power distribution is a critical factor in integrated circuit design. For example, a microprocessor integrated circuit such as a system-on-a-chip (SoC) contains numerous transistors that may shift from being idle to actively switching. The sudden transition of so many transistors causes the power supply voltage to the transistors to fluctuate. If the power supply voltage drops below a minimum required value, the system may reset or experience an error. The resistance of the power grid providing the power supply voltage is an important factor with regard to minimizing the voltage drop in response to the sudden activation of a circuit module. For example, the number of vias (via density) from the power rail to the various transistors in a circuit module may be increased compared to other modules depending upon the power demands. In addition, the width and density of the power rails may be increased. Similarly, the number of head switches coupling one power domain's rails to a main power rail may be varied depending upon a given circuit module's power needs. Finally, the number and density of decoupling capacitors supporting a given power domain's power rails may be varied also.

It is thus conventional to design an SoC to include a plurality of power-grid tiers. Each tier corresponds to a certain set of power-grid factors such as the via density, power rail width and density, head switch density, and decoupling capacitor density factors. These power-grid factors may be better appreciated with reference to a process flow for a traditional physical design (PD) of an integrated circuit as shown in FIG. 1. The process begins with a block floorplan flow step 100 that receives various inputs such as the desired netlist, the unified power format (UPF), timing constraints, multi-voltage (MV) island constraints, and pin preferences to perform a robust power-grid plan in which the logic functions for various hard macros (circuit modules) are assigned to a given power-grid tier based upon the inputs. The power-grid planning is deemed as "robust" in that a given hard macro is assigned to a corresponding power-grid tier—the resulting voltage rails will thus have the same via density and other power-grid tier factors throughout the entire hard macro. With the power-grid tiers assigned, a place and route step 105 may be performed that includes conventional cell placement, clock tree synthesis, routing, and finishing (engineering change order (ECO), and design-for-manufacturing (DFM) sub-steps. The process continues with a parasitic resistance and capacitance (RC) extraction step 110 followed by a timing, noise, and power analysis 115. Finally, the design is subjected to a current resistance (IR) drop analysis 120 that determines whether the hard macro has regions in which the power supply voltage has dropped undesirably. If the design does not satisfy the IR drop analysis, the power-grid planning step 100, place and route step 105, RC extraction step 110 and timing, noise, and power analysis step 115 are repeated as necessary to accommodate the necessary design modification through an engineering change order (ECO).

The conventional SoC design process must also satisfy density reduction and associated cost issues. It is thus quite challenging to assign the appropriate power-grid tier to a given circuit module. If the power-grid tier is too robust for the corresponding circuit module's power demands, density suffers. Conversely, if the power grid tier is insufficient, the circuit module may reset and/or malfunction due to an insufficient power supply voltage. In addition, factors such as non-linear resistance scaling, lack of on-chip resources, increased performance requirements, density, and routability complicate the design of the power-grid. For example, FIG. 2 illustrates the power supply voltage drops (IR drops) for a conventional hard macro designed according to the process flow discussed with regard to FIG. 1. In this instance, a third tier power-grid (PG3) has been selected for the entire hard macro. The design has resulted in a variety of clusters 200 of clock (CLK) drivers having large drive strength in the vicinity of the critical path, which causes undesired localized power supply voltage drops. Yet a substantial portion of the hard macro is over-served by PG3 such as a region 205, which lowers routability and increases costs.

Accordingly, there is a need in the art for improved power-grid architectures for integrated circuits.

SUMMARY

An improved power-grid tier design process is provided in which a hard macro receives a plurality of power-grid tier assignments. As used herein, "hard macro" refers to a fully routed design that is ready to be implemented in a semiconductor masking step during manufacture of a semiconductor die including the circuit module implemented through the hard macro. A critical path for the circuit module implemented through the hard macro receives a more robust power-grid tier whereas a remainder of the hard macro receives a less robust power-grid tier. In this fashion, the regions having a localized reduced power supply voltage and also the density issues resulting from a conventional fixed power-grid assignment to a hard macro are relieved.

These and additional advantages may be better appreciated through the following detailed description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

An adaptive multi-tier power grid for integrated circuits is provided in which the power-grid planning is relaxed during the design stage to accommodate localized areas of power supply voltage drop caused by the ohmic loss (current*resistance (IR)) within circuit elements such as clock drivers and to provide additional power grid resources for the die regions. As used herein, the regions having a localized power supply voltage drop are denoted as "hot spots." The relaxation of the power-grid planning enables an individual hard macro to include a plurality of power-grid tiers. In this fashion, the power-grid assignment is optimized in that critical path in the hard macro may receive the more robust power-grid tiers whereas the non-critical portions may receive the less robust power-grid tiers. In this fashion, the problems of an individual hard macro having both an insufficient power-grid tier in certain regions and an overly-robust power-grid tier in other regions are relieved.

As used herein, a power-grid tier refers to a certain assignment to each of the following factors: the number of vias (via density) from a power rail to the various transistors in a circuit module; the width and density of the power rails for a circuit module; the number of head switches coupling a power domain for a circuit module to a main power rail; and the number and density of decoupling capacitors supporting power delivery by the power rails for a circuit module. In particular, a power-grid tier refers to a specific assignment to at least one of these factors. One power-grid tier may then be classified as more robust compared to another power-grid tier if at least one of these factors is changed to produce less power supply voltage drop. In general, a designer may choose from a plurality of power-grid tiers, ranging from a lowest tier in which the factors have their lowest values to a highest tier in which the factors have their highest values.

To solve the problems of an individual hard macro having both an insufficient power-grid tier in certain regions and an overly-robust power-grid tier in other regions, the critical path for the hard macro is identified prior to the place and route step during the physical design process. More robust power-grid tiers for the critical path components are then assigned. The default state for the remainder of a hard macro would be a more relaxed power-grid tier, which results in greater density. With the critical path identified, its clock drivers may be de-clustered during the place and route step such that no oversized, unnecessarily large clock drivers need be used during the place and route stage. This de-clustering of the clock drivers improves the IR drop (localized hotspot) issue.

Figure 1:
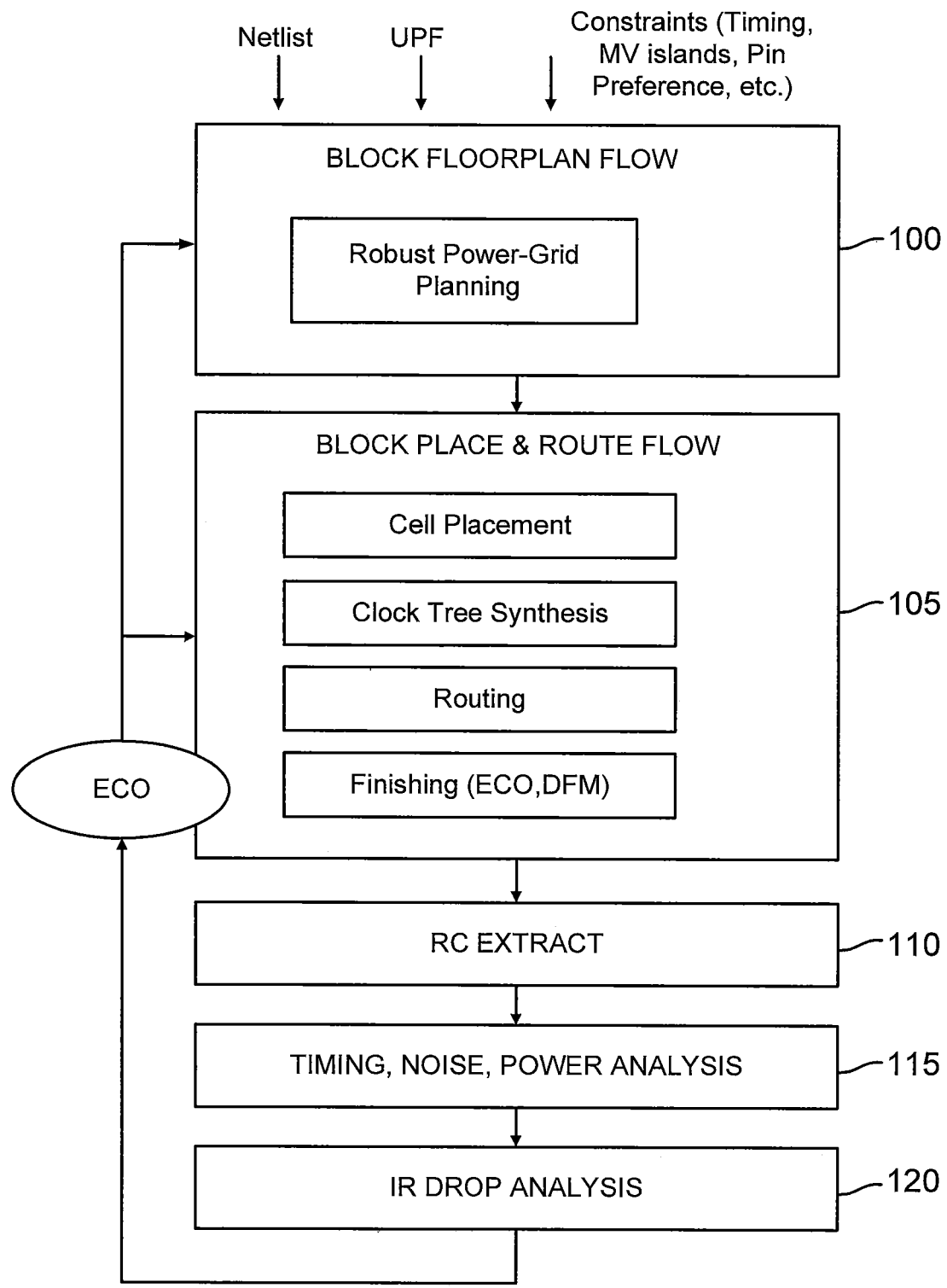
FIG. 1 is a flowchart for a conventional physical design process.
Figure 3:
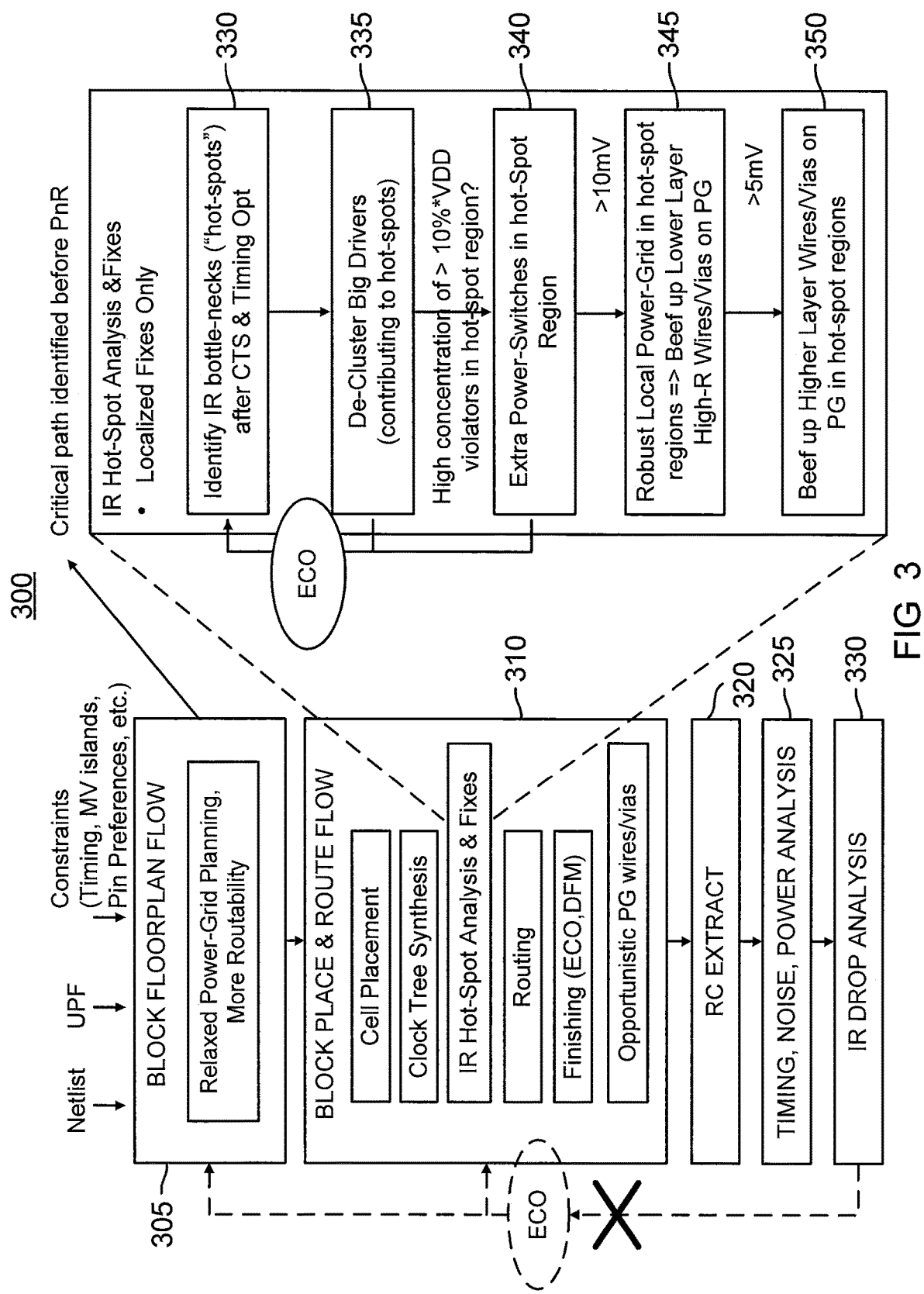
FIG. 3 is a flowchart for physical design process providing an adaptive power grid tier assignment for a hard macro in accordance with an aspect of the disclosure.

An example physical design flow 300 to achieve these advantageous results is shown in FIG. 3. The process begins with a power-grid planning stage 305 that depends upon the conventional netlist, unified power format (UPF), timing constraints, multi-voltage (MV) island constraints, and pin preference constraints as discussed with regard to stage 100 of FIG. 1. However, stage 305 is more relaxed as compared to stage 100 in that stage 300 involves the adaptive assignment of the power-grid tiers for a given hard macro through the identification of the critical path. The critical path components are thus assigned more robust power-grid tiers whereas a remainder of the hard macro is assigned less robust power-grid tiers. As noted earlier, each power-grid tier involves a certain assignment of via size, enclosure, via pitch and density, power and ground rail width and pitch, the density and pitch of power switches, and the density of the decoupling capacitors.

A subsequent place and route stage 310 includes a conventional cell placement and clock tree synthesis. But these conventional analyses are followed by a includes a power supply voltage drop (IR) hot spot analysis 330 that includes an identification of IR bottle-necks (IR hot spots) after the clock tree synthesis and timing optimization. For example, the IR hot spots are identified through a power supply voltage drop threshold being crossed in a simulation of the design. The clock drivers for the IR hot spots are then de-clustered in a stage 335. Should there be a certain remaining concentration of power supply voltage droops (for example, greater than ten percent of the power supply voltage) within the hot spot regions, the power-grid tier for the affected regions may be adjusted in a step 340 by assigning additional power switches to them. Should the resulting power supply voltage drop within the hot spot regions result in some deviation from VDD by a threshold value such as a deviation greater than 10 mV, the power-grid tier for the affected hot spot regions may be further adjusted by assigning a power-grid tier having more robust lower metal layer pitch and width for the power and ground (PG) rails in an act 345. In that regard, a semiconductor process will typically offer a plurality of metal layers ranging from a lowest-most metal layer adjacent the semiconductor die to a highest-most metal layer that is furthest from the semiconductor die. Act 345 is thus directed to increasing the pitch and width for the power and ground (PG) rails in the lower metal layers. Should the resulting power supply voltage drop within the hot spot region still have some reduced threshold deviation from VDD as compared to act 345 such as a power supply voltage drop greater than 5 mV, the affected regions may be assigned an even more robust power-grid tier having more robust upper metal layer pitch and width for the PG rails in an act 350. For example, in an embodiment having eight metal layers, the four lower-most metal layers may be affected by act 345 whereas the four higher-most metal layer may be affected by act 350. Conventional routing and finishing acts may then be performed followed by any necessary opportunistic adjustment of the power-grid tiers to complete place and route stage 310.

Figure 2:
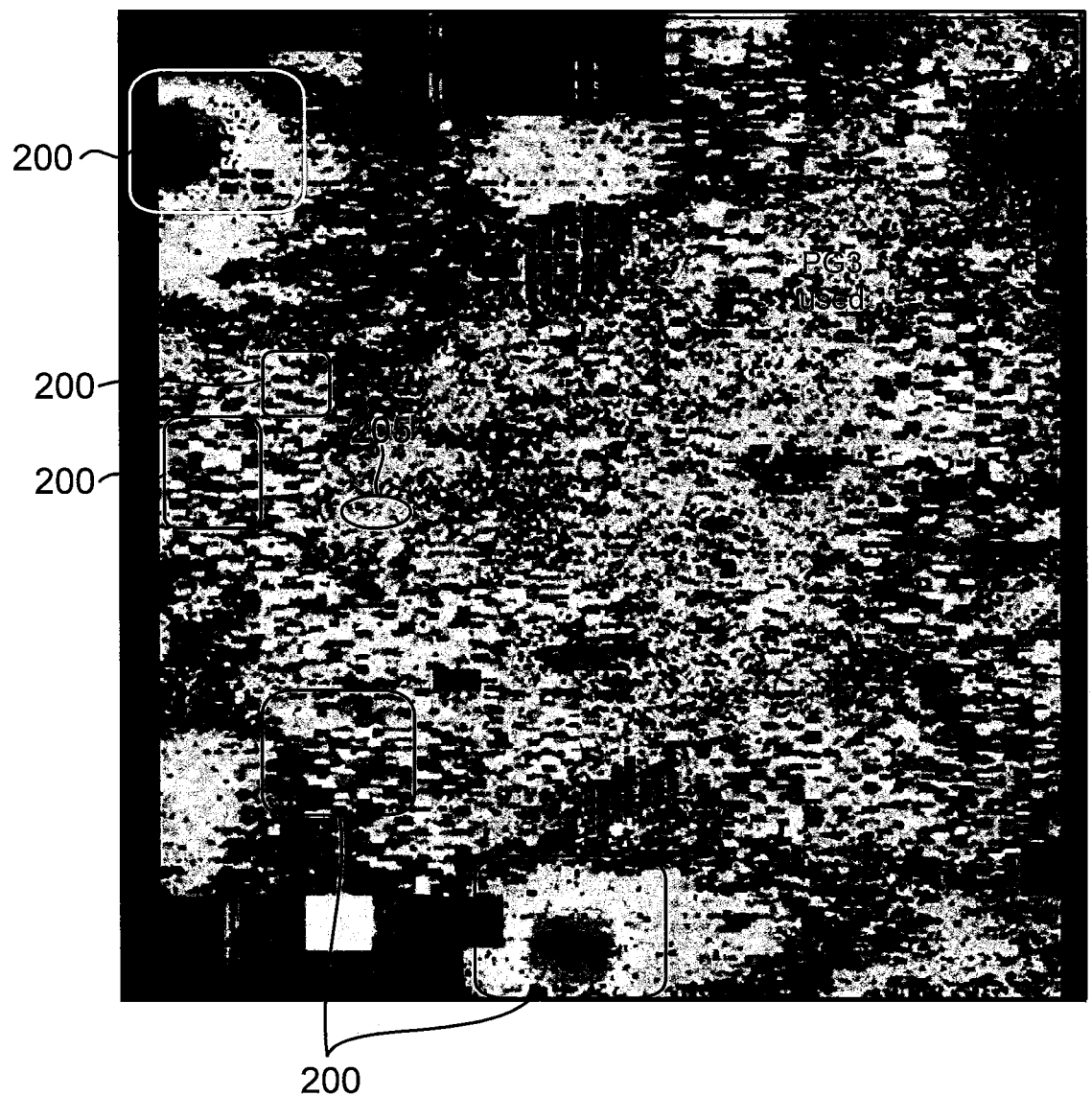
FIG. 2 illustrates the floorplan for a hard macro designed according to the process of FIG. 1.
Figure 4:
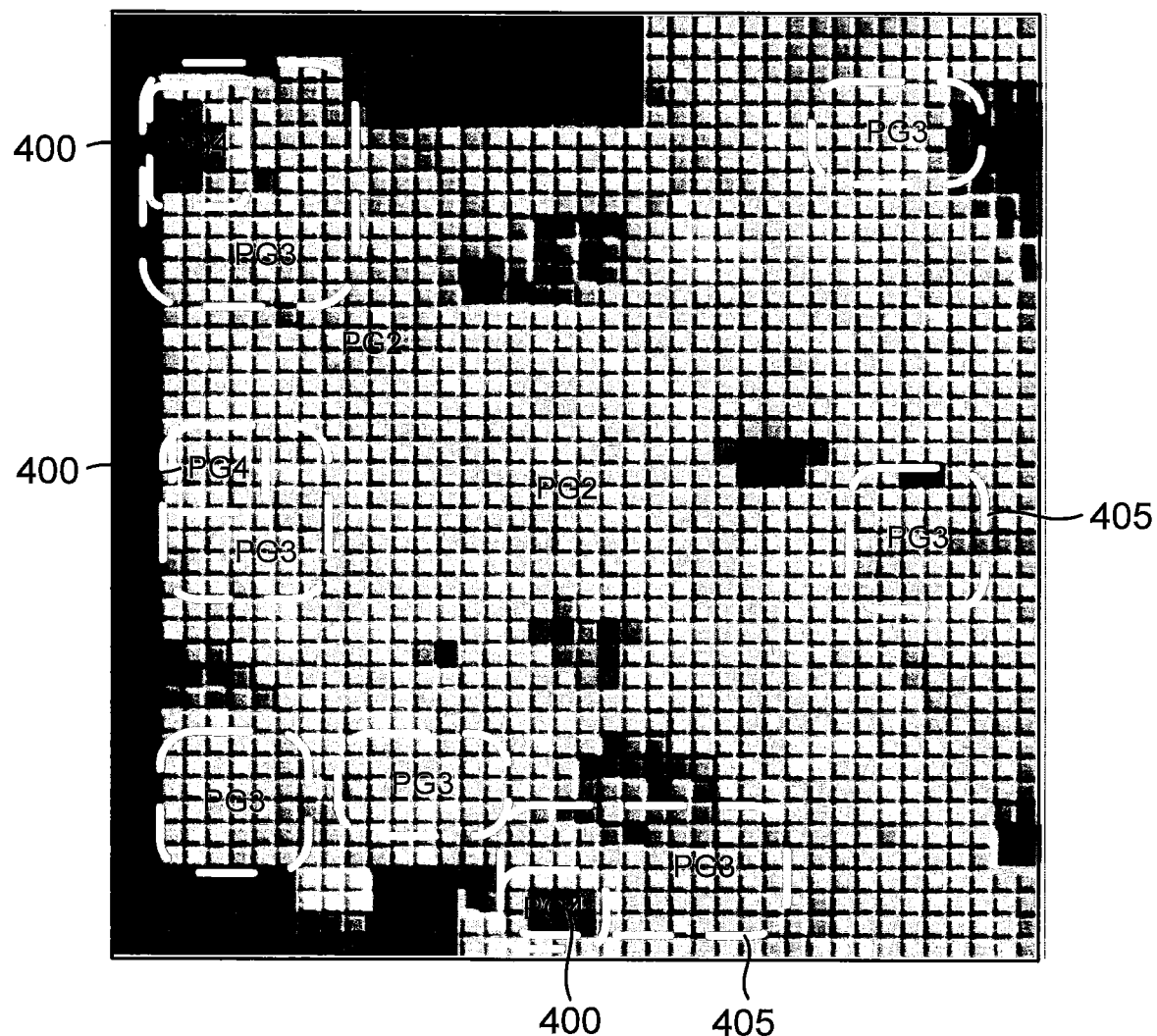
FIG. 4 is a floorplan for the hard macro of FIG. 2 designed according to the process of FIG. 3.

A conventional RC extraction stage 315, timing, noise and power analysis stage 320, and IR drop analysis follows place and route stage 310. But note that further engineering change orders are no longer necessary due to the adjustment of the power-grid tiers in place and route stage 310 and initial planning stage 305. The resulting adaption of the power-grid tiers are shown in FIG. 4 within the same hard macro as used in FIG. 2. Localized hot spots 400 are markedly reduced in size and are assigned the most robust power-grid tier (PG4). Other areas with more reduced power supply voltage drops as compared to hot spots 400 are assigned the second-highest power-grid tier (PG3). The bulk of the hard macro, however, has received the more relaxed power-grid tier (PG2). In contrast, the same hard macro designed using conventional techniques as discussed with regard to FIG. 2 used the more advanced power-grid tier PG3 across the entire hard macro, which lowers density yet results in the more aggravated hot spots 200. In contrast, the hard macro of FIG. 4 has improved metal layer utilization, greater density, and reduced manufacturing costs.

Figure 5A:
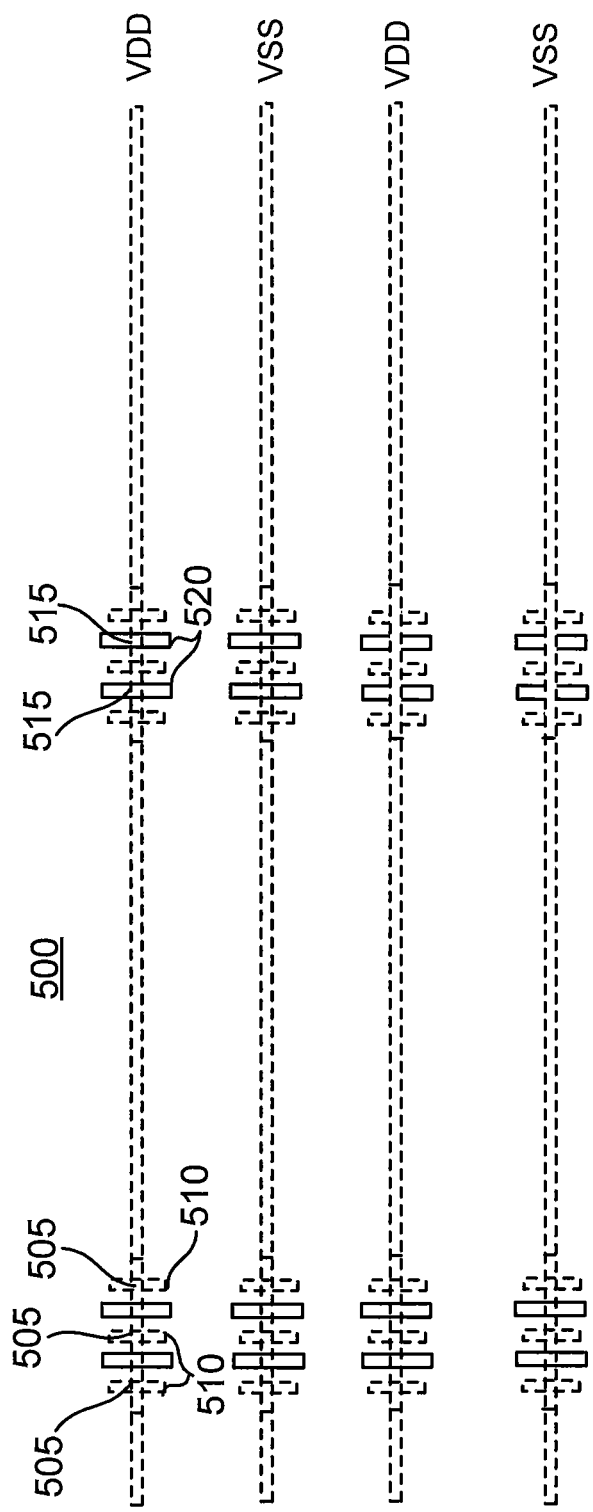
FIG. 5A is a plan view of the via density for metal layers M1-M4 for power-grid tiers PG2 and PG3 for a portion of a hard macro.
Figure 5B:
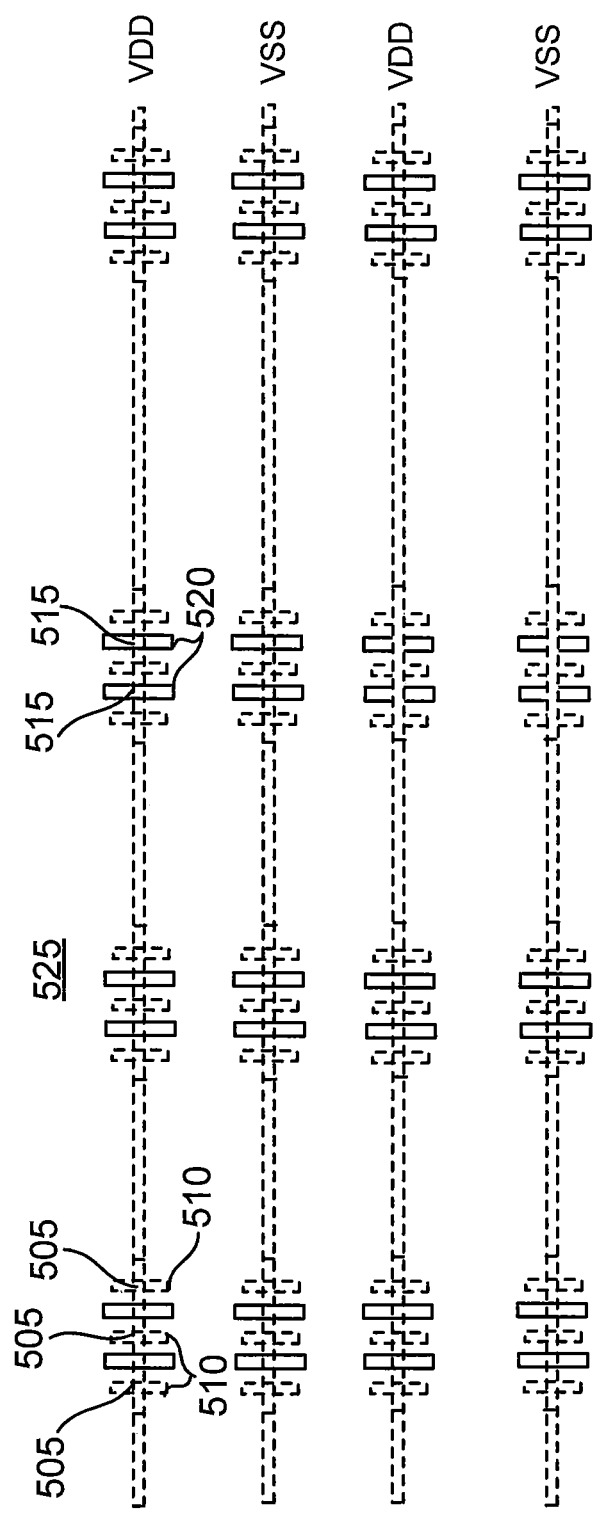
FIG. 5B is a plan view of the hard macro portion of FIG. 5A after an power-grid tier upgrade to PG4.

Power-grid tiers PG2 and PG3 share the same density of vias in the lower metal layer M1 through M4. For example, the via density is shown in FIG. 5A for metal layers M1 through M4 for a hard macro portion. Vias 505 extend from metal layer M3 to metal layer M1 for both the power rails VDD and the ground rails VSS and are surrounded by metal shields 510. Similarly, vias 515 extend from metal layer M4 to metal layer M2 for both the power rails VDD and ground rails VSS and are surrounded by metal shields 520. As shown in FIG. 5B when the same macro portion, is upgraded to power-grid tier PG4, the density of vias 505 and 515 is effectively doubled. In this fashion, a localized hot spot may be addressed through the assignment of a more robust power-grid tier. An example method of assigning the power-grid tiers for a hard macro will now be discussed.

Figure 6:
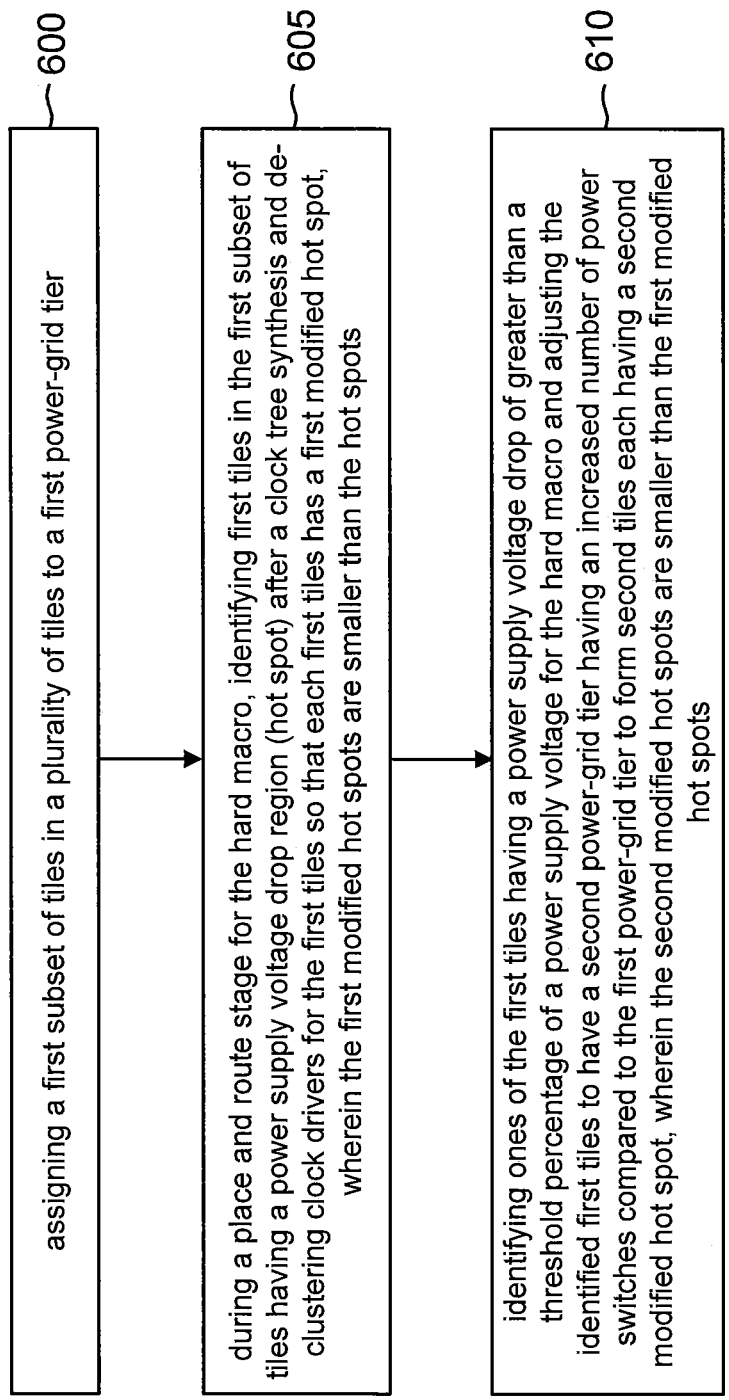
FIG. 6 is a flowchart for an example method of assigning the power-grid tiers for a hard macro in accordance with an aspect of the disclosure.

FIG. 6 is a flowchart for a method of assigning the power-grid tiers for a hard macro in accordance with an aspect of the disclosure. The method includes an act 600 that occurs prior to a place and route stage of identifying a critical path for a hard macro. An example of such an identification for act 600 occurs in the power grid planning stage 305 discussed with regard to FIG. 3. The method also includes an act 605 of performing a first power-grid tier assignment for the critical path in the hard macro and a second power-grid tier assignment for a remainder of the hard macro responsive to the critical path identification. The initial assignment of power-grid tiers as discussed with regard to power grid planning stage 305 of FIG. 3 is an example of act 605. The method further includes an act 610 of, during a place and route stage for the hard macro, identifying power supply voltage drop (IR) hot spots after a clock tree synthesis and de-clustering clock drivers to form first modified IR hot spots. The de-clustering of clock drivers as discussed with regard to step 335 of FIG. 3 is an example of act 610. Finally, the method includes an act 615 of adjusting the first power-grid tier assignment to have an increased number of power switches responsive to the first modified IR hot spots having an IR drop of greater than a threshold percentage of a power supply voltage for the hard macro to form second modified IR hot spots. The addition of extra power switches as discussed with regard to step 340 is an example of act 615.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A hard macro having a footprint on a semiconductor die, the hard macro comprising:
   a first power-grid tier for a first portion of the footprint, the first power-grid tier including a first plurality of power rails and ground rails; and
   a second power-grid tier for a second portion of the footprint, the second power-grid tier including a second plurality of power rails and ground rails, wherein the first power-grid tier includes a first plurality of decoupling capacitors arranged according to a first density and the second power-grid tier includes a second plurality of decoupling capacitors arranged according to a second density, wherein the second density is greater than the first density.

2. The hard macro of claim 1, wherein the first plurality of power rails and ground rails each has a first width and the second plurality of power rails and ground rails each has a second width that is greater than the first width.

3. The hard macro of claim 1, wherein the first power-grid tier includes a first number of decoupling capacitors and the second power-grid tier includes a second number of decoupling capacitors, and wherein the second number is greater than the first number.

4. The hard macro of claim 1, wherein the first power-grid tier includes a first number of power switches and the second power-grid tier includes a second number of power switches, and wherein a density for the second number of power switches is greater than a density for the first number of power switches.

5. The hard macro of claim 4, wherein the second number is greater than the first number.

6. The hard macro of claim 1, wherein the first portion of the footprint comprises a plurality of first tiles and the second portion of the footprint comprises a second plurality of tiles.

7. An integrated circuit, comprising:
   a first power-grid tier for a first portion of a footprint, the first power-grid tier including a first plurality of power rails and ground rails each having a first width; and
   a second power-grid tier for a second portion of the footprint, the second power-grid tier including a second plurality of power rails and ground rails each having a second width that is greater than the first width, wherein a first metal pitch for the first plurality of power rails and ground rails is greater than a second metal pitch for the second plurality of power rails and ground rails.

8. The integrated circuit of claim 7, wherein the first power-grid tier further includes a first plurality of power switches; and the second power-grid tier further includes a second plurality of power switches, wherein the second plurality of power switches is greater than the first plurality of power switches.

9. The integrated circuit of claim 7, wherein the second portion of the footprint includes a critical path for the integrated circuit, and wherein the first portion of the footprint does not include a critical path for the integrated circuit.

10. The integrated circuit of claim 7, wherein the first portion of the footprint comprises a plurality of first tiles and the second portion of the footprint comprises a second plurality of tiles.

11. The integrated circuit of claim 7, wherein the first power-grid tier includes a first number of vias and the second power-grid tier includes a second number of vias, and wherein a density for the second number of vias is greater than a density for the first number of vias.

12. The hard macro of claim 11, wherein the second number is greater than the first number.

* * * * *